July 7, 1936.     E. E. WEMP     2,046,439
CONSTANT MESH TRANSMISSION
Filed July 2, 1931     5 Sheets-Sheet 1

INVENTOR.
ERNEST E. WEMP.
BY Barnes + Kisselle
ATTORNEYS.

INVENTOR.
ERNEST E. WEMP.
BY
Barnes and Kissell
ATTORNEYS.

July 7, 1936.   E. E. WEMP   2,046,439
CONSTANT MESH TRANSMISSION
Filed July 2, 1931   5 Sheets-Sheet 3
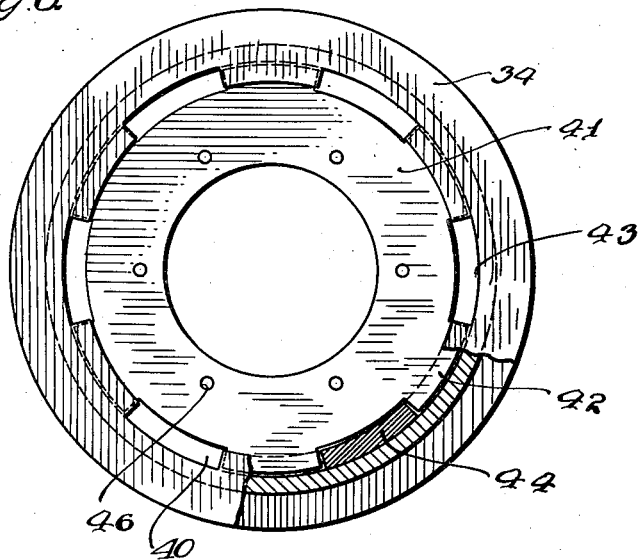
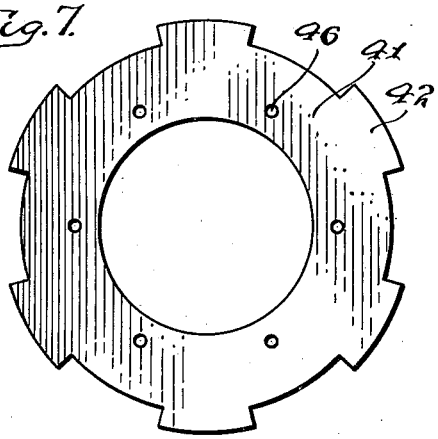
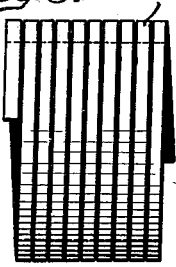
INVENTOR.
ERNEST E. WEMP.
BY Barnes & Kisselle
ATTORNEYS.

July 7, 1936.   E. E. WEMP   2,046,439
CONSTANT MESH TRANSMISSION
Filed July 2, 1931   5 Sheets-Sheet 4
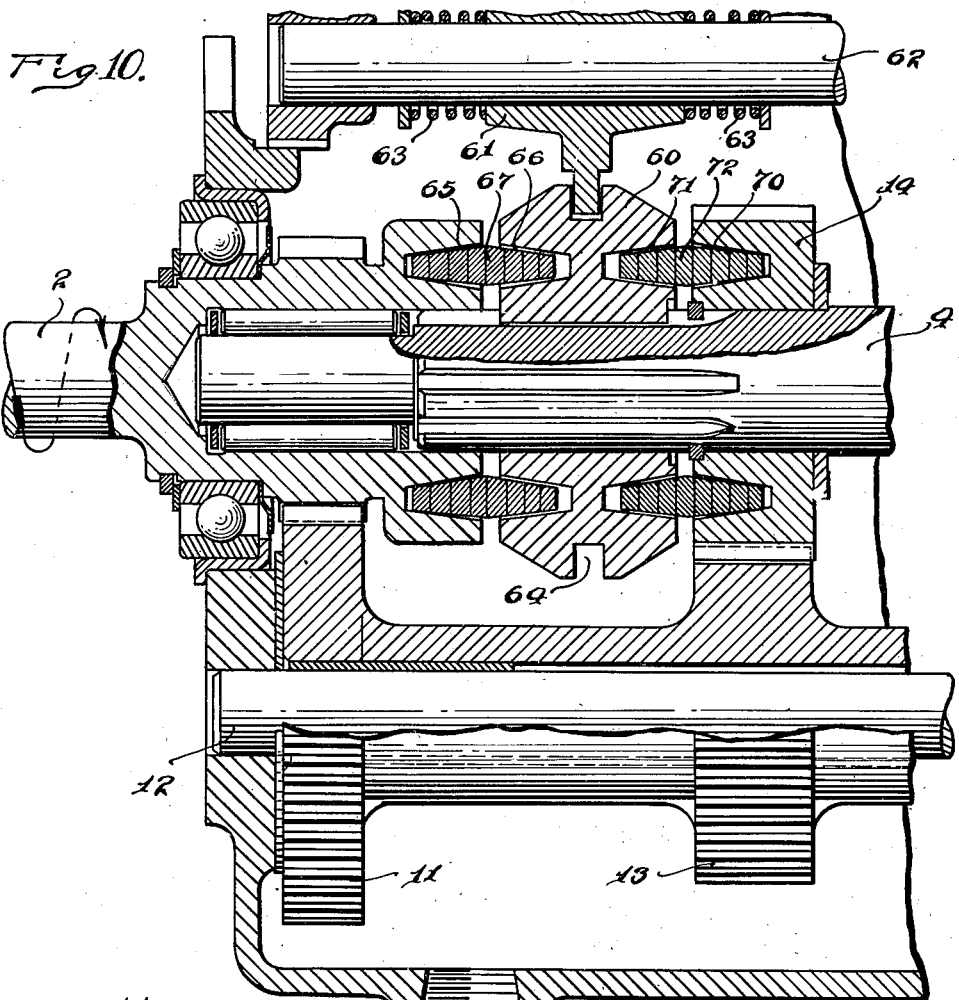
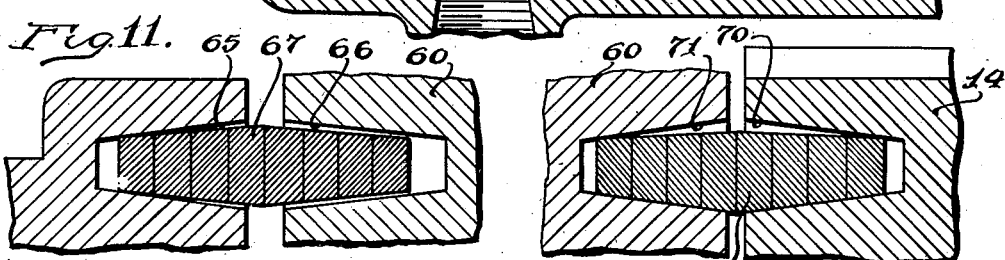
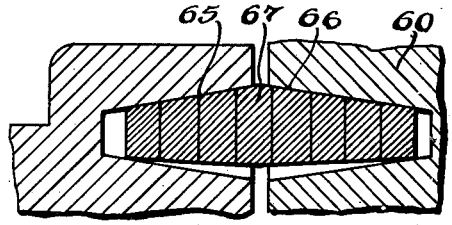
INVENTOR.
ERNEST E. WEMP.
BY Barnes and Kisselle
ATTORNEYS.

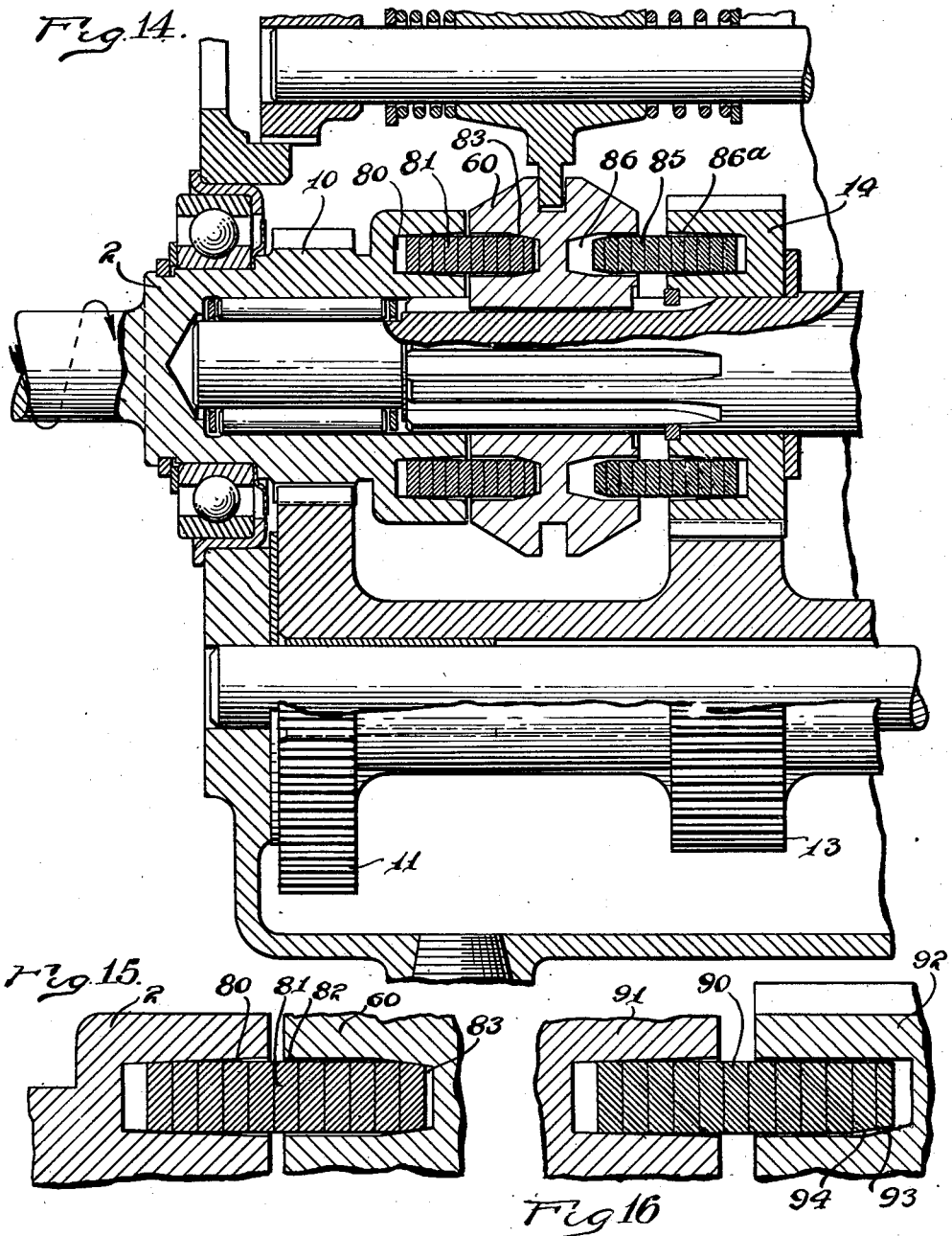

Patented July 7, 1936

2,046,439

UNITED STATES PATENT OFFICE 2,046,439

CONSTANT MESH TRANSMISSION

Ernest E. Wemp, Detroit, Mich.

Application July 2, 1931, Serial No. 548,392

9 Claims. (Cl. 192—48)

This invention relates to a power transmitting device in which selective means are provided for effecting different ratios as between driving and driven parts. More specifically the invention has to do with improvements in a constant mesh transmission.

The transmission shown in the accompanying drawings incorporates an arrangement such as may be employed in a vehicle, but it is to be understood that the invention is not limited to automotive vehicle transmissions. Heretofore in selective transmissions, an arrangement of gears or devices with teeth or dogs have been employed, some of which are shiftable to engage and disengage others for effecting different speed ratios. Such an arrangement necessitates a dental engagement. When, for example, two of such devices are about to be engaged, a clashing of gear teeth or dogs occurs unless the two members are substantially synchronized as to rotation prior to such dental engagement. This results in what is ordinarily termed a clashing of gears during the operation of an automotive vehicle, and this especially occurs with inexperienced drivers, or when the driver is unfamiliar with the particular vehicle in hand.

The present invention contemplates a selective transmission wherein dental engagement is eliminated, to the end that operation of the device for effecting change ratios between driving and driven parts may be quickly and easily made and noiselessly. The invention contemplates a structure wherein the parts which are about to be brought into driving relation may be initially substantially synchronized as to their rotation and then finally associated in driving relation. In accordance with the invention two rotatable elements may be associated either for independent rotation or so that one drives the other, and for this purpose an intermediate power transmitting element is provided. This intermediate element advantageously takes the form of a frictional gripping device, and more particularly, may be in the form of a coil spring, one or more of which may be employed as between the two rotatable elements. This intermediate element may perform the function of tending to synchronize the rotation of the two rotatable elements just prior to complete operative relation so that one drives the other, and then upon the completion of such operative relation, serve as an interconnecting device so that the one rotatable element drives the other.

In the accompanying drawings:

Fig. 6 is a detail showing a structural arrangement for some of the parts involved in the shifting device.

Fig. 7 is a detailed view of one of the parts in the shifting arrangement.

Fig. 8 is a side elevational view of a coil spring which may be employed as one of the intermediate connecting elements.

Fig. 9 is a side elevational view of another coil spring.

Fig. 10 is a sectional view of a power transmission device in illustration of a modified form.

Fig. 11 is an enlarged sectional view in illustration of the parts in neutral position.

Fig. 12 is an enlarged view in illustration of the parts in a driving position.

Fig. 13 is a similar enlarged section showing the parts in another driving position.

Fig. 14 is a sectional view illustrating a further modified form.

Fig. 15 is a detailed view of a spring of the form shown in Fig. 14.

Fig. 16 is a detail view of a still further modification.

Figure 1:
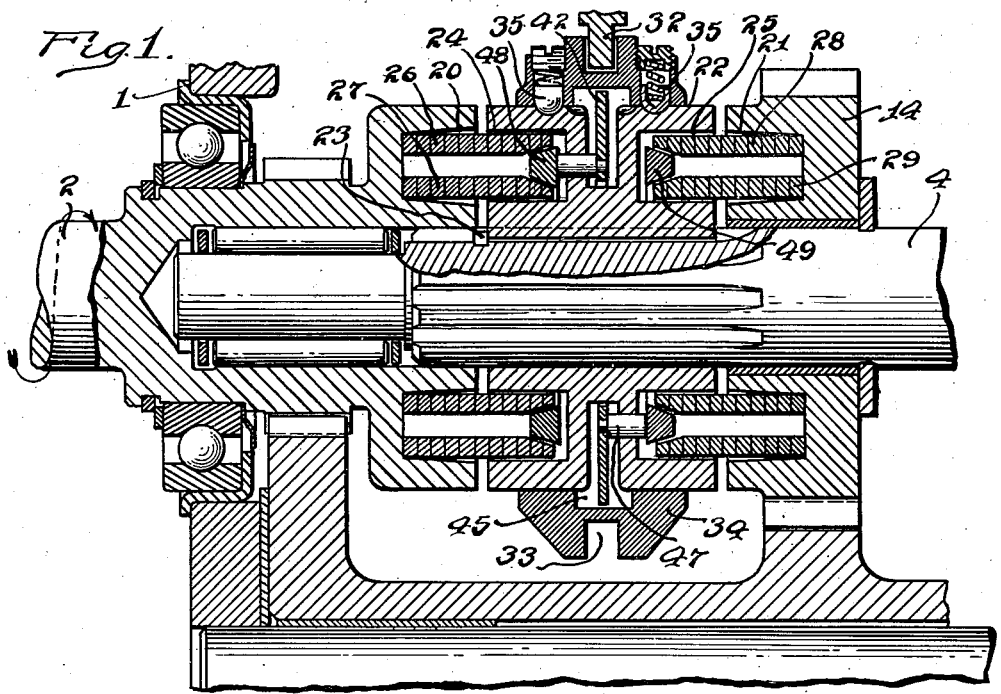
Fig. 1 is an enlarged sectional view of the speed changing mechanism showing the same in neutral or non-driving relation.

A housing for a transmission is shown at 1, and journaled in the same is a driving shaft 2. In an automotive vehicle this shaft may be the shaft driven by the usual clutch. Also journaled in the housing is a shaft 4; this may be termed the driven shaft, and shaft 2 may be termed the driving shaft. The inner end of the shaft 2 may be enlarged and of hollow formation, as shown, with the end of the shaft 4 journaled therein. Gear teeth 10 may be on the inner end of the shaft 2 and meshing with the teeth is the gear element 11 on counter shaft 12. The gear element 11 may be integral with another gear element 13 the teeth of which mesh with a gear 14 journaled on the shaft 4. The mechanism of the invention provides for the shaft 2 to drive shaft 4 directly so that the ratio is 1 to 1 and for the shaft 2 to drive shaft 4 through the gear train comprising parts 10, 11, 13 and 14 with a different ratio.

Referring now to Fig. 1 it will be noted that the inner end of shaft 2, which is enlarged, is provided with a circular recess 20. Similarly the gear 14 is provided with a circular recess 21. Mounted upon the shaft 4 is a member 22 which may be secured to the shaft by a spline connection as shown, and which may be definitely located on the shaft by a ring 23 which prevents shifting of the member axially in one direction, the member being prevented from shifting axially in the other direction by the end portions of the spline construction. This member 22 is provided with a circular recess 24 facing recess 20, and the circular recess 25 facing recess 21.

Intermediate frictional elements are arranged for operative engagement with the surfaces of these recesses. These elements may take the form of coil springs. A coil spring 26 is positioned in the two recesses 20 and 24 and this spring has a diameter so that its outside surfaces lie next adjacent to the outer circumferential walls of the two recesses. Another coil spring 27 may be disposed in these same two recesses but having a smaller diameter so that its inner surface lies adjacent the inner circumferential walls of the two recesses. In the present case the winding of these two springs are in the same direction; preferably right hand winding. Spring 26 is illustrated in Fig. 8 where the right hand winding is apparent. Situated in the two recesses 21 and 25 are two similar coil springs 28 and 29. In this case the springs are of opposite winding or of left hand winding, as shown by spring 29 (Fig. 9). The elements having the aligned circular recesses preferably are arranged so that in normal operation they have no relative axial movement.

Figure 2:
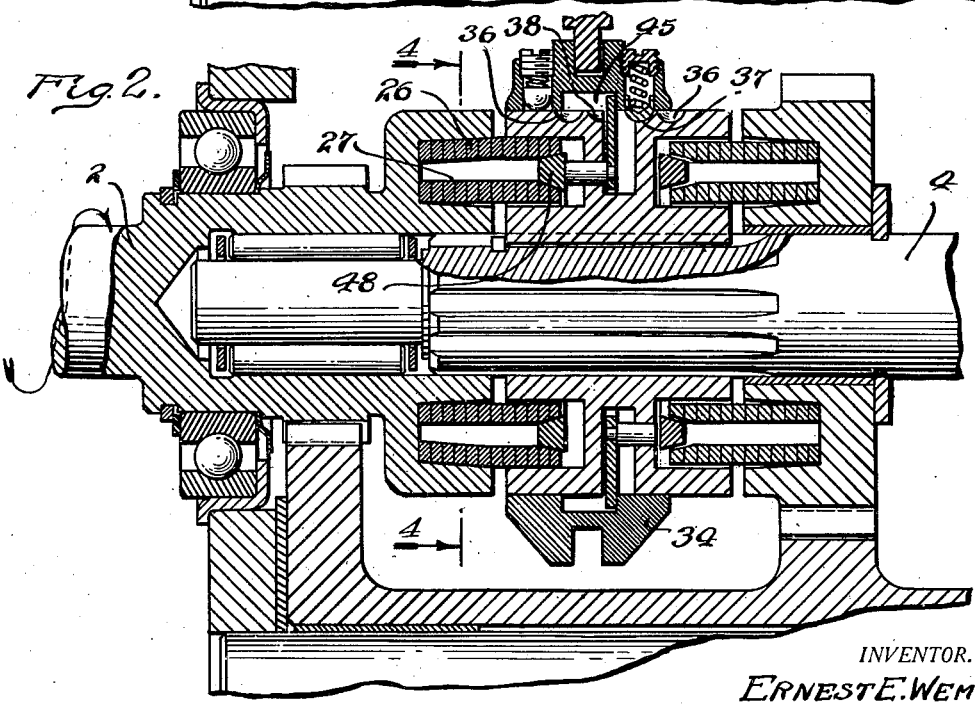
Fig. 2 is a view similar to Fig. 1 illustrating the parts in a position for interconnecting a driving and a driven element.

A control lever is articulated with a shiftable member having a projection 32 which engages in a recess 33 of an axially shiftable member 34. This member is mounted upon the member 22 and it may have one or more spring-pressed plungers 35 which engage in recesses 36 in the member 22 for normally holding the member in the position illustrated in Fig. 1. Upon manipulation of the member the member 34 may be shiftable to a position as illustrated in Fig. 2 at which time one of the plungers 35 engages an inclined face 37 as shown in Fig. 2 thus holding the member 34 in this shifted position. Member 34 may be shifted reversely to the position shown in Fig. 3 wherein the other plunger 35 engages the inclined face 38 of a notch in the member 22 thus holding the member 34 in this shifted position.

Details of the structure of member 34 are shown in Fig. 6, and it may be provided with spaced circumferentially arranged notches 40, advantageously six in number. An actuator ring 41 may have projections 42 corresponding to the notches 40. The actuator ring is assembled to member 34 by relative axial movement with the projections 42 passing through the notches 40 whereupon the two members are given relative rotative movement to position the projections 42 in alignment with parts 43 between the notches 40. Then one or more keys 44 may be passed through the apertures 40 so as to prevent relative rotation between members 34 and 41 so that they are maintained assembled. It may be pointed out that the member 34 has an inner circumferential recess 45 in which the projections 42 are located.

Actuator studs are carried by the member 41 and they may be six in number, for which purpose the member 41 has a corresponding number of apertures 46. These studs are shown at 47 and have reduced ends advantageously press-fitted into the apertures 46. Three of these studs extend in one direction and three extend in the opposite direction with alternating studs extending in opposite directions. These studs are reciprocably mounted in apertures provided in the member 22 through the walls defining the bottoms of the circular recesses 24 and 25. Inside these circular recesses are what may be termed energizing rings 48 and 49 preferably of frusto-conical shape in cross-section. The end portions of the coil springs which are adjacent these energizing rings are beveled as by means of a machine operation to correspond generally to the shape of the frusto-conical energizing rings.

Figure 3:
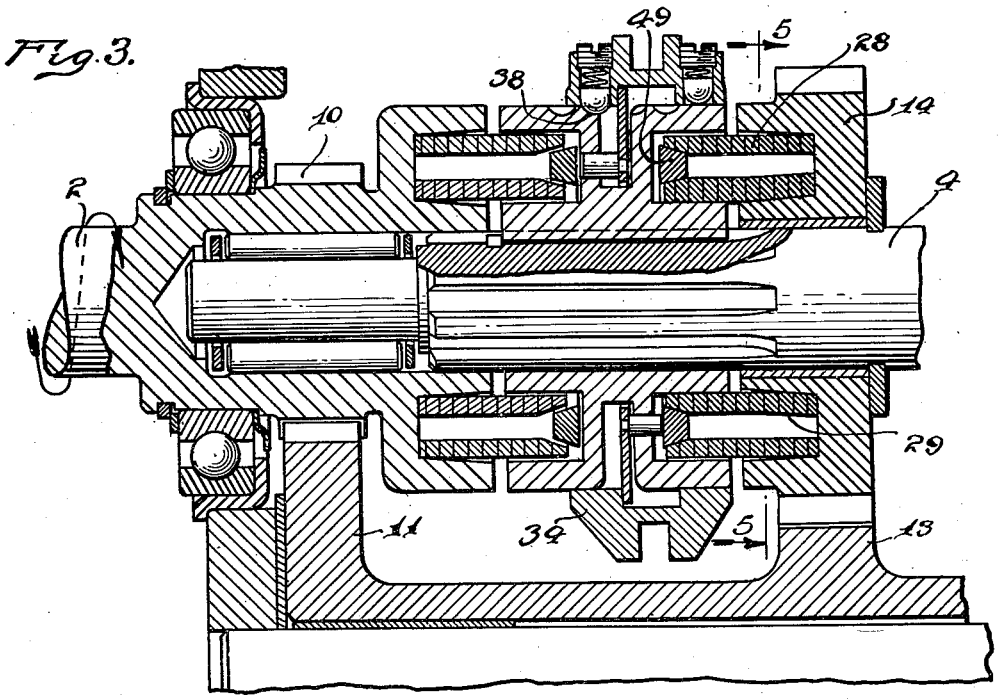
Fig. 3 is a view similar to Fig. 2 illustrating the parts shifted to establish another connection between the driving and driven members.

It will be observed by reference to Figs. 1, 2 and 3, that the recess 20 and the recess 21 are confined by walls angularly disposed as regards the axis of the springs. This is shown materially exaggerated in the drawings for the sake of clearness, although it is to be appreciated in an actual structure this degree of angularity is slight. The left hand ends of the springs 26 and 27 may be such as to snugly fit within and frictionally grip the walls near the base of the recess 20, so that there is a frictional relation between the springs and the member 2. The right hand end of springs 28 and 29 may fit snugly into the base portions of recess 21 so that there is a frictional engagement between these springs and gear 14. The springs 26 and 27 fit sufficiently loosely in recess 24, and the springs 28 and 29 fit sufficiently loosely in the recess 25 to permit of relative rotation. This also is shown in an exaggerated manner in the drawings.

Figure 4:
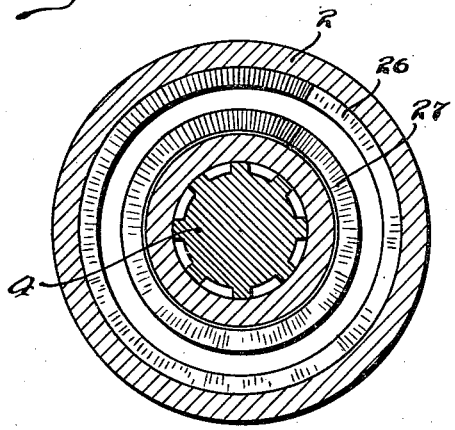
Fig. 4 is a sectional view taken substantially on line 4—4 of Fig. 2.

The angular disposition of the walls of the recesses 20 and 21 provides for a gradual and increasing energization of the coil springs. Considering Fig. 1, let it be assumed that the shaft 2 is revolving in the direction indicated by the arrow which is clockwise considering Fig. 4. The ends of the springs 26 and 27 being in frictional engagement with the walls of recess 20, may rotate therewith; however, these springs are out of frictional contact with the walls of the recess 24. Thus the member 22 may remain stationary. Also upon this rotation of shaft 2, gear 14 is rotated. Springs 28 and 29 having their right hand ends in frictional engagement with walls of recess 21 may rotate with gear 14 but are free to rotate relative to member 22. Thus the parts are shown in Fig. 1 in neutral position.

Assume now that an operator shifts the lever to position the parts as shown in Fig. 2; the shoulder at one side of the recess 45 engages the actuator ring 41 and urges it from right to left. This in turn reciprocates the pins 47, shifting the same axially from right to left, thus shifting energizing ring 48. The energizing ring 48 thus frictionally engages the end convolution or convolutions of spring 26. Initially, the left end convolution of the spring is in frictional engagement with the outer wall of the recess 20 and the energizing ring, in engaging an end convolution or end convolutions of the spring 26, exerts frictional resistance to the rotation of the spring. This tends to unwind or expand the spring 26. It will be seen then that at first, the initial frictional engagements tend to synchronize the relative rotation of parts 2 and 22. This energization of the end convolutions of the spring, or in other words, this effect of frictionally engaging the ends of the spring with parts 2 and 22 through the energizing ring 48, effects expanding of the spring, and as the part 2 begins to drive part 22 the spring is further expanded and the convolutions become progressively energized or caused to frictionally engage the outer walls of recesses 20 and 24. Upon complete energization of the spring it may appear substantially as shown in Fig. 2. If, however, the torque is light only some of the end convolutions of the spring may be expanded enough to frictionally engage the recess walls.

It may be pointed out that a coil spring for transmitting power offers a highly efficient frictional engagement. The frictional engagement afforded by such a spring substantially squares itself with each added convolution. The gripping effect also depends upon the coefficient of friction which may be determined by the materials involved, in length of the circular arc in contact with the spring, and a radius of the frictionally engaged surface, but these factors may be varied as desired and may be determined for definite structures.

Thus it will be seen that with the parts in position, shown in Fig. 2, the driving shaft 2 drives shaft 4 directly through the frictional engagement of the coil spring 26 with the outer circumferential surfaces of recesses 20 and 24. Under this condition it is to be noted that the spring 27 is also affected, but this spring also comprises a right hand winding, so that the tendency upon spring 27 with the parts in position, as shown in Fig. 2, is to also unwind or expand this spring so that there is no tendency to cause it to engage inner frictional surfaces of the recesses. Thus this spring is inactive. However, suppose that the direction of power is reversed and shaft 4 tends to rotate faster than shaft 2, as is the case in an automotive vehicle where the engine is decelerated and the momentum of the car turns the engine. Member 22 then tends to turn faster than member 2 and this has the effect of winding up or contracting spring 26 rendering the same ineffective for tying the driven and driving parts together; but at this time spring 27 is contracted against the inner surface of the circular recesses, thus maintaining the driving connection between members 2 and 4. During all this time the gear 14 is revolving but the springs 28 and 29 are turning relative to the member 22.

Figure 5:
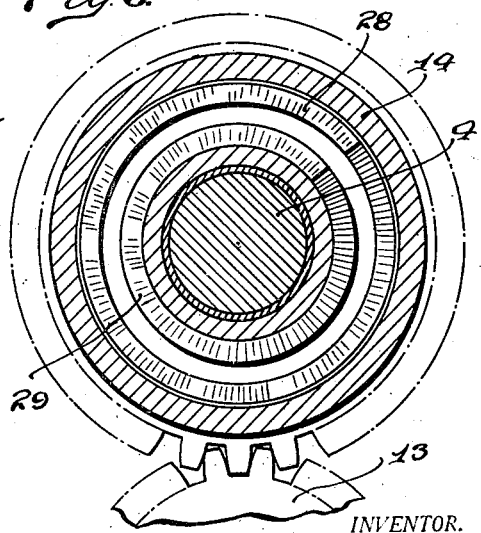
Fig. 5 is a sectional view taken substantially on line 5—5 of Fig. 3.

For effecting a different gear ratio between shaft 2 and shaft 4 the lever may be shifted to position the parts as shown in Fig. 3. Assume that gear 14 is rotating in the direction of the arrow which is clockwise as Fig. 5 is viewed, and the shaft 4 stationary. As soon as actuator ring 49 frictionally engages the end of spring 28 the tendency is to decelerate rotation of gear 14. Assume that shaft 4 is rotating slowly and gear 14 rapidly, the tendency is to synchronize the rotation. Then when power is applied to cause shaft 2 to drive in the direction of the arrow, gear 14 tends to drive member 22 through the frictional engagements of the ends of spring 28. In other words, the ends of the spring are energized and relative rotation as between gear 14 and member 22 tends to unwind or expand the spring 28, as it is a spring of left hand winding, and in so doing the convolutions progressively engage the outer circular walls of recesses 21 and 25 thus establishing positive drive connection. As spring 29 is also of left hand winding, the tendency is to unwind or expand this spring away from the adjacent walls of the recesses thus rendering this spring ineffectual. Suppose, however, that member 22 and shaft 4 tend to overrun gear 14; this action tends to wind up the left hand spring 28 releasing the frictional grip which it has with members 14 and 22 destroying the drive connection, but at this time the winding up of spring 29 also occurs and its convolutions progressively frictionally engage the inner circumferential walls of the recesses 21 and 25 thus maintaining a drive connection.

In Fig. 2 the spring 26 is shown in extremely expanded driving condition; when spring 28 is extremely expanded in driving condition it is expanded in a manner similar to the manner in which spring 26 is shown in Fig. 2. In Fig. 3 the smaller or inside spring 29 is shown in extremely contracted drive-establishing condition, and it will be understood that spring 27 in a similar drive-establishing condition takes the position similar to that shown for spring 29. Inasmuch as the torque capacity increases with the radius, the springs have been arranged so that the outside spring forms the normal drive connection from shaft 2 to shaft 4, whether it be direct or through the reducing gears with the overrun driving connection established through the springs of smaller diameter. This is thought to be the preferred arrangement although it is not absolutely essential that such an arrangement be employed. It will be noted that when the parts are in driving position, as shown in Fig. 2, the spring-pressed plunger 35 engaging the angle surface 37 tends to maintain the energizing ring 48 urged towards springs 26 and 27 to tend to maintain them energized. Also, with the parts shown in Fig. 3 the spring pressed plunger which engages inclined surface 38 tends to keep the energizing ring 49 urged towards springs 28 and 29 to tend to maintain their energization.

A further explanation may be offered as to the synchronization provided by this construction. Let there be pictured a shift from position 2 to position 3: if member 2 is rotating faster than member 22 the spring 26 will frictionally engage them to bring them substantially to a uniform rotation as spring 26 is expanded under this condition. Spring 27 may assist but its expansion under this condition is not effective to cause it to grip the recess walls; if member 22 is rotating faster than member 2 as shift is made, the tendency is to wind up the springs in which event spring 27 may serve the major part of bringing these parts to synchronization as it, upon contraction, frictionally engages the recess walls, and while there is a friction afforded by spring 26, its contraction tends to loosen or eliminate its frictional contact with the recess walls. The same thing is true as regards springs 28 and 29, as one may serve the major portion for synchronizing the parts 14 and 22 when one of such members is rotating faster than the other with the other spring serving the major portion of the synchronization when any other of said members is rotating at a higher rate.

It may be further pointed out that the shifting of the mechanism from the neutral position of Fig. 1 to either drive position as shown in Figs. 2 and 3, or from the position of Fig. 2 to the position of Fig. 3, or reversely, may be quickly and easily accomplished with a substantially continuous action, as no pause or break is necessary between the times when the parts are becoming synchronized and of full engagement. In other words, the synchronizing tendency is effected in an automatic manner and may be said to be the initial state of positive drive connection.

A modified form of the invention is shown in Figs. 10 to 13. In these drawings many of the transmission parts are the same as in the foregoing form of the invention, and accordingly the same reference characters are applied thereto. In this form a shiftable driven member 60 is mounted upon shaft 4 as by means of a spline connection so that it may be shifted axially. This may be accomplished by a shifting block 61 reciprocally mounted upon shaft 62 and which may be balanced between coil springs 63. The block 61 has a part which enters a groove 64 in the driven member 60. Member 2 has a circular recess 65 the walls of which may be angularly disposed, and the member 60 has a circular recess 66, the walls of which may be similarly angularly disposed. A single coil spring 67 is disposed in these recesses. This coil spring preferably has its ends machined so that the adjacent convolutions present angular or inclined faces, the inclination of which is preferably slightly less than the inclination of the walls of the recesses 65 and 66. Where member 2 is the driving member and 4 the driven shaft with the direction of rotation, as indicated by the arrow, spring 67 will be a right hand spring, preferably. The gear 14 has a recess 70 and member 60 has another recess 71, and in these recesses is located a single coil spring 72, which under the conditions above mentioned is preferably of left hand winding. The walls of the recesses 70 and 71 are angularly disposed with the angularity of the spring ends being slightly less than the walls of the recesses.

The parts, as shown in Fig. 10, are in neutral position, in which both the springs 67 and 72 are merely floating in their recesses. In other words, member 2 may be rotating but the spring 67 does not establish a drive between the shaft 2 and member 60, as the spring may be substantially out of effective frictional engagement with either member 2 or 60, or both. In other words, it is in a floating condition. The same thing is true for spring 72. This condition is shown in an exaggerated manner in Fig. 11. Now assume that the member 60 be shifted from right to left; the first thing that happens is a frictional engagement of the ends of the spring 67 against the walls of the recesses, as the bottom of the recesses have a diameter less than the cross sectional diameter of the last convolution of the spring. This tends to synchronize the rotation of members 2 and 4 after the manner as above pointed out; then as member 2 starts to drive in the direction of the arrow, the spring 67 begins to expand and its convolutions progressively, from its outer ends inwardly, frictionally engage or become energized with the radially outward wall of the recesses. The maximum energized position is shown in an exaggerated manner in Fig. 12. Assume that member 60 tends to overrun member 2; spring 67 will then become contracted or wound up with the result that its convolutions frictionally engage the radially inward recess walls as shown in an exaggerated manner in Fig. 13. Spring 72 works in an identical manner; it is preferably of left hand winding, and when member 14 is driving, spring 72 expands, and when member 4 tends to override member 14 the spring 72 contracts. In the first case the spring is energized against the radially outward walls of recesses 70 and 71, and in the second they are frictionally engaged and are energized against the radially inward walls of these recesses. These springs therefore serve to provide a drive connection irrespective of whether member 2 is driving member 4 or member 4 is tending to drive member 2 by engaging the outer and inner walls of the recesses, respectively. Their synchronizing effect occurs in like manner; in other words, just prior to complete drive connection when the member 2 is overrunning member 4, spring 67 tends to synchronize the two with frictional engagement effected largely by expansion of the spring, whereas if member 4 is rotating faster than member 2, the synchronizing tendency is effected largely by a contraction of the spring. A further modified arrangement is shown in Figs. 14 and 15. Most of the parts in this form are like those shown in Fig. 10 and have the same reference characters applied thereto. However, recess 80 in member 2 has walls which are slightly inclined whereas the spring 81 has one end with substantially straight sides fitting in recess 80 relatively tightly. The recess 82 in member 60 may have inclined walls 83 near its bottom portion with the end of the spring tapered as shown. Similarly, the spring 85 has one end tightly fitted in recess 86a of member 14 so as to at all times rotate therewith with the recess 86 in member 60 formed similarly to recess 82.

In neutral position, as shown in Fig. 14, the springs 81 and 85 rotate, respectively, with members 2 and 14. As member 60 is shifted from right to left the inclined surfaces 83 frictionally engage the end convolutions of spring 81 whereby it is caused to expand, and upon such expansion the convolutions progressively, from the ends toward the center, move outwardly and frictionally engage the walls of the recesses. When member 60 is reversely shifted spring 81 continues rotating with member 2 but is freed from member 60, and spring 85 then becomes energized with member 60 just as spring 81 was energized. Preferably spring 81 is of right hand winding, and spring 85 of left hand winding where the direction of drive rotation is as indicated by the arrow so that in normal drive the springs expand to take advantage of the increased radius, whereas in the overrunning action they contract to establish the drive. These springs serve to effect the synchronization of the parts immediately preceding energization of the springs sufficient for establishing a positive non-slipping drive in a manner similar to that in which springs 67 and 72 perform this function. The primary difference being that whereas springs 67 and 72 are floating in neutral position springs 81 and 85 are constantly engaged with one rotatable member.

There has been shown and described a transmission capable of effecting only two changes in gear ratio; that is to say, a direct drive or an indirect drive through the gear train. This, however, is quite ample for disclosing the principle of the invention, and it is to be appreciated that the shiftable units may be duplicated as desired to provide any desired number of shifts for effecting different ratios, or for effecting a reverse in driving direction.

In Fig. 16 a spring 90 has one end located in the recess of a member 91 so as to be constantly engaged thereby, and the member 92 has a recess in which only one wall is inclined as shown at 93, and the spring has an inclined or machined part 94 designed to contact therewith. Under normal conditions the spring 90 rotates with member 91, and as member 92 is shifted from right to left, surface 93 frictionally engages portion 94 of the spring, and the spring becomes energized and expands or contracts in accordance with the direction of the applied torque to engage the recess walls and establish a drive connection between parts 91 and 92. This form is quite similar to forms shown in Figs. 14 and 15, the difference being that of a single inclined wall of a recess instead of two inclined walls.

I claim:

1. The combination with a driving member and a driven member having facing circular recesses, a coil spring located in the recesses, means including an axially shiftable member and surfaces inclined relative to the axis for directly frictionally engaging the end convolutions of the spring to effect frictional tendency for synchronizing the driving and driven members, said spring expanding and contracting in accordance with the direction of applied torque whereby its convolutions may frictionally engage walls of the recesses to establish a driving connection between driving and driven members.

2. The combination of a driving member, a driven member disposed in axial alignment with the driving member, each member having a circular recess therein with the recesses facing each other, a coil spring disposed with some of its convolutions in one recess and some of its convolutions in the other recess, and means operable to shift the driven member axially toward and away from the driving member to establish a frictional connection between the spring and the driving member and between the spring and the driven member, said spring expanding by torque in one direction so that its convolutions frictionally engage the outer walls of the recesses and contracting by torque in the opposite direction to frictionally engage the inner walls of the recesses.

3. The combination of a driving member having a circular recess with tapering walls, a driven member in axial alignment with the driving member and having a recess with tapering walls facing the recess in the driving member, a coil spring, the convolutions of which taper substantially from its center portion to its end portions and disposed in the recesses of the driving and driven members, and means for shifting one of the members axially relative to the other member.

4. The combination of a driving member having a circular recess with tapering walls, a driven member in axial alignment with the driving member and having a circular recess with tapering walls facing the recess in the driving member, a coil spring disposed in said recesses, the convolutions of the coil spring tapering from the center portion of the spring to opposite ends thereof and means for shifting one of the members axially relative to the other, the angularity of the recess walls being slightly greater than the angularity of the tapering convolutions of the spring, whereby the end convolutions of the spring are frictionally gripped by the walls near the bottom of the recesses as the driven member and driving member are shifted toward each other.

5. The combination of a driving member having a circular recess, a driven member having a circular recess facing that in the driving member and said members being disposed on the same axis, a coil spring disposed in the facing recesses having some of its convolutions in one recess and some of its convolutions in the other recess, the walls of the recess in one member being tapered so that the recess narrows towards its bottom, and some of the convolutions of the spring being tightly gripped in the narrowed portion, and means for shifting the other member axially to frictionally engage and release the convolutions of the spring in the recess of said last named member.

6. The combination of a driving member having a circular recess, a driven member disposed axially with respect to the driving member and having a circular recess facing the recess in the driving member, a coil spring disposed in the recesses having some of its convolutions tightly engaged in the recess in the driving member and loosely engaged in the recess in the driven member, and means for shifting the driven member axially toward and away from the driving member to engage and release frictionally the coil spring by the walls of the recess in the driven member.

7. The combination of a driving member having a circular recess, a coil spring with some of its convolutions located in the recess and frictionally gripped therein whereby the spring rotates with the member, a driven member having a circular recess into which some of the convolutions of the spring project, the convolutions of the spring in the last mentioned recess being loose in the recess, the bottom of the recess in the driven member being tapered and means for shifting the driven member axially toward the driving member to engage the convolutions of the spring with the tapered portions of the recess.

8. The combination of a driving member, a driven member, said members having facing circular recesses and said recesses having inner and outer walls for friction engagement, a coil spring disposed in said recesses, and axially shiftable means comprising surfaces disposed at an angle to the axis for direct frictional engagement with the convolutions of the spring.

9. The combination of a rotatable driving member, a rotatable driven member, said members having matching circular recesses with inner and outer walls for frictional engagement, a synchronizing and clutching element comprising a coil spring, said spring being located in the matching recesses, the structure including axially shiftable surfaces disposed at an angle to the axis of rotation for directly frictionally engaging the spring, whereby frictional action first tends to synchronize the rotatable members and then causes the spring convolutions to frictionally engage and grip walls of the recesses to effect a driving clutch action.

ERNEST E. WEMP.